United States Patent

[11] 3,617,165

| [72] | Inventor | Gregoire Kalopissis<br>Paris, France |
|---|---|---|
| [21] | Appl. No. | 576,839 |
| [22] | Filed | Sept. 2, 1966<br>Continuation-in-part of Ser. No. 523,525, Jan. 28, 1966, which is a continuation-in-part of Ser. No. 227,542, Oct. 1, 1962, abandoned |
| [45] | Patented | Nov. 2, 1971 |
| [73] | Assignee | Societe Anonyme dite: L'Oreal<br>Paris, France |
| [32] | Priorities | Apr. 20, 1966 |
| [33] | | France |
| [31] | | 58,324;<br>Jan. 1, 1966, Luxembourg, No. 50,228;<br>June 14, 1966, Luxembourg, No. 51,325;<br>June 16, 1966, Luxembourg, No. 51,345 |

[54] POLYMERIC HAIR COLORING COMPOSITIONS
6 Claims, No Drawings

[52] U.S. Cl. .................................................. 8/10.1,
8/10, 260/80.72, 424/47, 424/71

[51] Int. Cl. ........................................................ A61k 7/12
[50] Field of Search ............................................ 8/10.1, 10;
260/80.72; 424/71, 47

[56] References Cited
UNITED STATES PATENTS

| 2,632,004 | 3/1953 | Minsk et al. .................. | 260/152 |
| 2,732,382 | 1/1956 | Minsk ........................... | 260/152 X |
| 3,251,743 | 5/1966 | Hahn et al. ................... | 8/10.1 |
| 3,364,186 | 1/1968 | Wilhelm et al. .............. | 260/80.72 |

*Primary Examiner*—Albert T. Meyers
*Assistant Examiner*—Vera C. Clarke
*Attorney*—Holcombe, Wetherill & Brisebois ABSTRACT: Soluble colored polymers that are suitable for use as hair dyes.

POLYMERIC HAIR COLORING COMPOSITIONS

My original conception related to the use as hair lacquers and setting lotions of a water-soluble polymeric substance consisting essentially of a dye chemically bonded to a polymer. The object was to provide a method of temporarily coloring hair by applying thereto a readily removable coloring material, without actually dyeing the hair itself. In order for the material to be readily removable it must, in practice, be water-soluble, since water is by far the most universally available liquid and does not have other characteristics rendering it unsuitable for casual and frequent use n the hair, as many solvents do. Aqueous solutions, mixtures, and dispersions containing both a dye and a polymer are, however, unsatisfactory for various reasons, including in some cases a tendency for the dye to dye instead of merely coat the hair, separation of the dye from the polymer during storage, a tendency of the dye to rub off on the skin or clothing, etc., etc. It is therefore essential that the dye be chemically bonded to the polymer.

At the time my invention was conceived there were no known water-soluble colored materials suitable for use in coating hair in which the dye was chemically bonded to the polymer. Those products which did contain dyes chemically bonded to the polymer, were not water-soluble and were used for distinctly different purposes. There were of course many water soluble polymers, but none of these had dyes chemically bonded thereto.

It will be appreciated that a product suitable for use in coloring hair must also satisfy many other requirements. For example, it was essential to find a dye which could be chemically combined with a polymer without impairing its qualities as a dye, and it was also essential that the end product be nonirritating to the skin.

I accordingly undertook considerable research and developed a colored polymer, hereinafter referred to as "-Polymer A," which was formed by reacting a polymer comprising acid halide functions of the type –COX, in which X indicates a halogen, with an aromatic diamine having one or two primary or secondary amine groups. The result is an amide bond and a colored polymer which is ordinarily soluble in water, since the amide groups of the polymer are, in most cases, not fully substituted.

A number of new types of colored polymers were developed and found suitable for use in hair treating preparations:

B. The polymers which result from the simultaneous condensation of at least one alcohol and either at least one hydroxyl dye or at least one amine dye, or a mixture of these two types of dye, on a polymer obtained by the copolymerization of equimolecular quantities of maleic anhydride and an unsaturated monomer.

C. Polymers comprising at least one monomer suitable for the production of cosmetic resins and at least one monomer having a reactive epoxy group to which a dye is chemically bonded by condensation with either the primary or secondary amine group or the hydroxyl group of the dye. It was subsequently found that by far the most satisfactory of these polymers were those in which the monomer having the epoxy group is condensed with the extra-nuclear primary or secondary amine group of a dye having such an extra-nuclear amine group. Copolymers of this particular species are hereinafter referred to as being of type C.

D. A copolymer comprising a first conventional monomer suitable for cosmetic use and a second monomer having a reactive chlorine group bonded to a dye having a tertiary amine function quaternized to said reactive chlorine group.

Since in France these copolymers and the methods of using them were considered a single invention, corresponding French applications were filed, naming Mr. Viout and I as coinventors. However, when it came time to file in the U.S.A., in view of the requirement for election made in connection with Ser. No. 227,542, separate applications directed to the last copolymer and method of making it, were filed as follows:

Copolymer B.—Application being filed of even date herewith Ser. No. 576,811, filed Sept. 2, 1966.

Copolymer C.—Ser. No. 549,446, filed May 12, 1966.

Copolymer D.—Ser. No. 546,545, filed May 2, 1966.

These applications were filed jointly in my name and that of Mr. Viout, since Mr. Viout, while working along lines indicated by me, had done much of the creative work involved in synthesizing the polymers.

The latest polymers, being first disclosed in a U.S. application filed today are:

E. Polymers closely related to those of group B, characterized by the fact that the macromolecular chain thereof comprises monomeric units to which an extra-nuclear amine dye is attached by a chemical bond of the amide type, said bond being formed by the nitrogen of the extra-nuclear amine function. The said monomeric units may be of any of the following types:

1. Acid anhydrides corresponding to the formula:

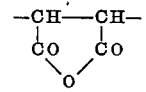

2. Acid halides and especially chlorides corresponding to the formula:

3. Esters corresponding to the formula:

in which R represents an alkyl group comprising from one to four carbon atoms, inclusive.

F. Dye reacted or condensed polymers comprising homopolymers, to the macromolecular chain of which at least one amine dye is attached by a chemical bond of the amide type, in which dyes have been attached at some points along the chain and other groups, e.g., alcohols, at other points.

In the case of each colored polymer several examples of methods of synthesizing the polymer are described in order to avoid any objection on the ground of inadequate disclosure. However, the claims of the present application are limited to compositions including these polymers which are suitable for application to the hair for cosmetic purposes and methods of so applying them.

The common thread which unites all the hair treating compositions and methods claimed herein is the use of a composition containing a colored or color imparting polymer in which the dye is chemically bonded to the polymer and in which:

1. The dye is so firmly attached to the polymer that it will not come off on the skin or clothing.

2. The resulting colored copolymer is both water and alcohol soluble.

3. The basic polymer has desirable cosmetic properties, and both the cosmetic properties of the polymer and the coloring properties of the dye remain unimpaired by the bonding.

It should be emphasized at this point that the mere fact that a copolymer is colored or even that the dye is chemically bonded to the polymer affords no assurance that the polymer is suitable for use on the hair.

For instance, even though the resins should be water-soluble, they must have a high-resistance to humidity so as to avoid giving the hair a sticky appearance. It must be possible to include them in solutions which in no way injure or irritate the skin and have no damaging effect on the hair. The resins must be sufficiently hard and transparent to impart a sheen to the hair. They must be removable by vigorous brushing, but have no tendency to crumble or peel off in the absence of such brushing. Any or all of these and other essential properties may be adversely affected when a dye is bonded to the polymer. The problem of developing a product in which the bond between the dye and polymer is made without having any adverse effect on any desired properties of either the dye or the polymer is therefore extremely difficult, particularly when it is born in mind that the product must be relatively cheap to produce in a relatively pure form, free of contaminants, such as uncombined dye which might come off on the skin or clothing.

Turning now to the colored resin hereinbefore identified as being of type C, this resin is essentially characterized by the fact that it consists of a polymer comprising on the one hand monomers suitable for the production of cosmetic resins and, on the other hand, at least one monomer having a reactive epoxy group to which a dye having an extra-nuclear primary or secondary amine group is chemically bound by condensation with said amine group.

The monomers comprising an epoxy group may be for example glycidyl methacrylate, glycidyl acrylate, or allylglycidyl ether.

The other monomers which may be used for obtaining cosmetic resins include vinylic esters such as vinyl acetate, vinyl lactams such as vinylpyrrolidone, alkyl acrylates or methacrylates, and acrylamides or methacrylamides whether substituted or not.

Among the extra-nuclear amine dyes which may be used in carrying out the invention are those corresponding to the following formula:

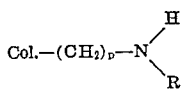

in which p is a number between two and six inclusive,

R is a hydrogen atom, the radical -$CH_3$, or the radical -$C_2H_5$.

The expression Col. indicates a cyclic or polycyclic dye such, for example, as a benzene or anthraquinone dye.

Among the dyes falling within the foregoing definition the most useful are those which have one or two supplementary amine functions directly attached to the ring.

In order to obtain the desired shade, several colored polymers having different colors can be mixed together, or several successive dyes of different colors may be bound to the copolymer. In this case only a small proportion of the first dye is used so that sufficient epoxy groups remain on the copolymer to permit a second and even a third dye to be bound to the copolymer.

In certain cases it may be advantageous to condense a dye on the colorless copolymer in less than stoichiometric proportions so as to leave epoxy groups which may improve the cosmetic qualities of the resin.

The properties of these colored polymers are obviously dependent on the starting monomers as well as on the proportion in which they are mixed.

These copolymers may for example contain from 2 to 30% and preferably from 5 to 20% of the monomer having the reactive epoxy group, such as glycidyl methacrylate, glycidyl acrylate, or allylglycidyl ether.

In addition to those monomers, such as vinyl acetate, which impart a tendency toward insolubility to the resin, these copolymers comprise, depending upon the properties desired, about 5 to 30% of monomers which render the resulting resin soluble in alcohol or water, an indispensable property, particularly when it is to be used in aerosol or solution form.

Vinylpyrrolidone, in the proportions indicated above, is preferably used for this purpose.

In order to prepare the hair lacquers or setting lotions, these colored copolymers may be used alone or mixed with other colorless polymers such as polyvinylpyrrolidone or copolymers such as polyvinylpyrrolidone/vinyl acetate, in proportions which depend on the intensity of the color sought.

These copolymers may be prepared according to various known processes. However, it seems preferable to carry out the polymerization in a solvent such as dioxane, dimethylformamide, or the ketones, in the presence of a catalyst such as benzoyl peroxide or azodiisobutyronitrile.

The condensation with the epoxy group and the bonding of the dye to the resin may be carried out by heating the dye and the colorless copolymer in a solvent such as dimethylformamide, dioxane or the ketones.

It has been noted that if a dye having extra-nuclear primary or secondary amine groups is used, it is not necessary to employ a catalyst.

The progress of the condensation reaction may be easily followed by measuring the progressive disappearance of the epoxy group.

It is noteworthy that the reaction of the dye on the copolymer according to the invention in no way affects the shade of the dye, or the cosmetic properties of the resulting colored resins as compared with those of the colorless starting resins.

Another object of the present invention is to provide hair lacquers or setting lotions characterized by the fact that they contain in an alcoholic or hydroalcoholic solution at least one colored copolymer of the type hereinbefore described.

In order to obtain aerosol lacquers according to the invention, it is possible, for example, to first prepare a 2 to 20% and preferably a 4 to 12% solution of the colored copolymer hereinbefore described, (or a mixture of this colored copolymer and another cosmetic resin) in alcohol, and then add to this solution from two to three times its own weight of a propellant which has been liquefied under pressure, such as any of the halogenated hydrocarbons sold under the trademark "FREON."

Setting lotions according to the invention may be prepared by mixing into an alcoholic solution having from 20° to 50° of alcohol about 0.5 to 6%, and preferably from 1 to 4% by weight of at least one colored copolymer such as has been described which copolymer may be mixed with other colorless cosmetic resins.

Of course, the hair lacquers and setting lotions according to the invention may comprise any other substances customarily used for cosmetic purposes such, for example, as plasticizers or perfumes.

The hair lacquers or lotions made from colored copolymers according to the invention have the same cosmetic properties as hair lacquers or setting lotions made from colorless resins having the same composition, except for the dye.

The color of the resins makes it possible for them to impart to the hair a certain shade without any deterioration in its other cosmetic properties.

Tests have shown that the colored copolymers according to the invention do not stain the skin or clothing against which they rub after having been applied to the hair.

Moreover, resins according to the invention are completely and easily removed by washing or brushing, so that the hair may be given a certain particular shade or color for as short a time as may be desired.

In order that the invention may be more clearly understood insofar as it relates to copolymers of type C, several examples will now be described, without limiting the scope of the invention to the details thereof.

EXAMPLE 1

Preparation of copolymer comprising 70% vinyl acetate, 25% vinylpyrrolidone and 50% glycidyl methacrylate The following monomers are introduced into a flask provided with an agitator, a condenser, a thermometer, and a tube for introducing nitrogen:

| | |
|---|---|
| Vinyl acetate | 140 g. |
| Vinylpyrrolidone | 50 g. |
| Glycidyl methacrylate | 10 g. |

300 g. of dioxane and 3 g. of azodiisobutyronitrile are added, and the mixture heated to reflux for 24 hours. After cooling the copolymer is precipitated with ether, and dried.

A 95% yield of a white powder is obtained, said powder having an epoxy index corresponding to the polymerization of 4.5% of the glycidyl methacrylate.

EXAMPLE 2

Preparation of a copolymer comprising 70% vinyl acetate, 20% vinylpyrrolidone and 10% allylglycidyl ether The following monomers are introduced into a flask provided with an agitator, a condenser, a thermometer and a tube for introducing nitrogen:

| | |
|---|---|
| Vinyl acetate | 140 g. |
| Vinylpyrrolidone | 40 g. |
| Allylglycidyl ether | 20 g. |

300 g. of dioxane, and then 3 g. of azodiisobutyronitrile and 3 g. of benzoyl peroxide are added.

The mixture is heated to reflux for 16 hours. After cooling the copolymer is precipitated, using ethyl ether, and dried.

A 91% yield of a white powder is obtained, which has an epoxy index corresponding to the polymerization of 7.5% of the allylglycidyl ether.

EXAMPLE 3

Preparation of a copolymer comprising 70% vinyl acetate, 25% vinylpyrrolidone and 50% allylglycidyl ether The procedure is the same as in example 1, except that the glycidyl methacrylate is replaced by allyglycidyl ether.

The result is a 95% yield of a colorless copolymer having an epoxy index corresponding to the polymerization of 3.8% of the allylglycidyl ether.

While as hereinbefore indicated dyes having an extra-nuclear amine function are preferred, it is possible to color copolymers such as the one described in example 1, using dyes having a primary or secondary amine group directly attached to the nucleus, and to use such colored polymers for treating the hair as shown by the following examples:

EXAMPLE 4

Coloring of the copolymer described in example 1 by condensing its epoxy groups with 1,4-diamino anthraquinone having the formula:

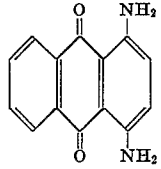

30 g. of the copolymer described in example 1, 4.4 g. of the above dye, and 50 g. of dimethylformamide are introduced into a flask provided with agitating means, a thermometer, and a reflux condenser. The quantity of dye introduced is double the theoretical amount.

The mixture is heated to 100° C. for 15 hours while keeping track of the evolution of the condensation by means of the epoxy index. At the end of the reaction the polymer is precipitated, the uncombined dye removed, and the polymer dried.

The result is a 70% yield of a violet colored powder, which is soluble in alcohol and in a hydroalcoholic mixture.

It was found that 75% of the epoxy groups have been condensed with the dye.

EXAMPLE 5

The following solution is prepared:

| | |
|---|---|
| Copolymer described in example 4 | 3 g. |
| Copolymer described in example 3 | 5 g. |
| Polyvinylpyrrolidone | 1 g. |
| 96° alcohol | 50 cc. |
| Water, q.s.p. | 100 cc. |

45 g. of FREON 11 and 30 g. of FREON 12 are added to 25 g. of this solution and the resulting mixture introduced into an aerosol bomb.

When sprayed on ordinary chestnut hair, a violet glint results.

Turning now to methods using the preferred dyes having extra-nuclear primary or secondary amine groups:

EXAMPLE 6

Preparation of a colored copolymer by condensing the epoxy group of the copolymer described in example 3 with the anthraquinone dye having the formula:

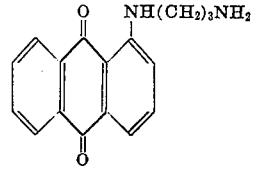

30 g. of the copolymer described in example 24 and 170 g. of dioxane are introduced into a flask provided with an agitator, a condenser, a thermometer, and a tube for introducing nitrogen. After dissolving, 2.8 g. of the above dye, which corresponds to 1 mole of dye for each mole of epoxy, is added.

The mixture is heated to reflux for 15 hours. After the reaction, the copolymer is precipitated, using ethyl ether, and dried.

A yield of 85% by weight of a cerise red powder is obtained, which is soluble in alcohol and in a hydroalcoholic mixture.

Analyses have shown that 76% of the theoretically possible quantity of the dye is combined.

EXAMPLE 7

Preparation of a colored copolymer by combining the epoxy group of the copolymer described in example 2 with the dye having the formula:

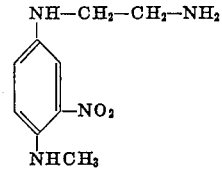

60 g. of the copolymer described in example 2 and 140 g. of dioxane are introduced into a flask provided with an agitator, a condenser, a thermometer and a tube for introducing nitrogen. After the copolymer has completely dissolved, 8.28 g. of the above dye, which amounts to 1 mole of dye per mole of epoxy, is added, while stirring.

The mixture is heated to reflux for 18 hours. After the reaction, the copolymer is precipitated, using ethyl ether, and dried.

The result is a yield of 84% by weight of a violet powder which is soluble in alcohol and in a hydroalcoholic mixture.

Analyses have shown that 83% of the theoretically possible quantity of the dye is combined.

EXAMPLE 8

Preparation of a colored copolymer by condensing the epoxy group of the copolymer described in example 2 with a dye having the formula:

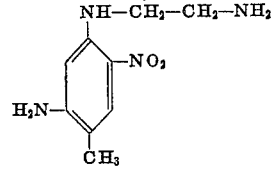

30 g. of the copolymer described in example 2 and 70 g. of dioxane are introduced into a flask provided with an agitator, a condenser, a thermometer and a tube for introducing nitrogen. After this has dissolved, 4.14 g. of the above dye, which corresponds to 1 mole of dye per mole of epoxy, is added, while stirring.

The mixture is heated to reflux for 18 hours. At the end of the reaction the copolymer is precipitated, using ethyl ether, and dried.

The result is a yield of 87% by weight of a yellow powder which is soluble in alcohol and in a mixture of water and alcohol.

Analyses have shown that 90% of the theoretically possible quantity of dye is combined.

EXAMPLE 9

Preparation of a colored copolymer by condensing the epoxy group of the copolymer described in example 2 with a dye having the formula:

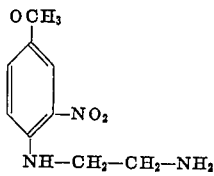

18.5 g. of the copolymer described in example 2 and 49 g. of dioxane are introduced into a flask provided with an agitator, a condenser, a thermometer and a tube for introducing nitrogen. After dissolving, 2.56 g. of the above dye, which corresponds to 1 mole of dye per mole of epoxy, is added, while stirring.

This is heated to reflux for 18 hours. After the reaction the copolymer is precipitated, using ethyl ether, and then dried.

The result is a yield of 85% by weight of a yellow-orange powder which is soluble in alcohol and in a hydroalcoholic mixture.

Analysis has shown that 88% of the theoretically possible quantity of the dye is combined.

APPLICATIONS

EXAMPLE 10

A setting lotion according to the invention is made by preparing the following solution:

| | |
|---|---|
| Copolymer obtained as set forth in example 7 | 2 g. |
| Ethyl alcohol | 50 ml. |
| Water, q.s.p. | 100 ml. |

This lotion is applied to brown hair after shampooing. The hair is then set in the usual manner.

After drying the hair has a violine mahogany shade.

EXAMPLE 11

In order to make a colored aerosol lacquer according to the invention, the following solution is first prepared:

| | |
|---|---|
| Copolymer obtained as in example 7 | 1 g. |
| Copolymer obtained as in example 9 | 1.7 g. |
| Polyvinylpyrrolidone | 5 g. |
| Absolute alcohol, q.s.p. | 100 g. |

30 g. of this solution is introduced into a aerosol bomb with 43.8 g. of the product sold under the trademark "FREON 11" and 26.1 g. of the product sold under the trademark "FREON 12."

When sprayed onto the hair the result is a mahogany lacquer which does not rub off on clothing or pillows. It is easily removed by brushing and shampooing.

EXAMPLE 12

In order to make a colored aerosol lacquer according to the invention, the following solution is first prepared:

| | |
|---|---|
| Copolymer obtained as in example 6 | 0.05 g. |
| Copolymer obtained as in example 9 | 0.1 g. |
| Vinyl acetate/vinylpyrrolidone copolymer | 5 g. |
| Alcohol, q.s.p. | 100 g. |

30 g. of this solution is mixed in an aerosol bomb with 43.8 g. of the product sold under the trademark "FREON 11" and 26.1 g. of the product sold under the trademark "FREON 12."

When sprayed onto the hair the result is a golden lacquer particularly suitable for use on chestnut hair, which does not rub off on clothing or pillows. It may be removed by brushing.

It will be appreciated that the scope of the invention is not limited in its scope to the details of the examples which have been given and that they may be suitably modified without thereby departing from the basic principles of the invention.

It will be observed that, due to the presence of a COOH group, the colored polymer of type C is soluble in water as well as in alcohol.

Turning now to colored resins of type E listed in the prefatory portion of this specification, colored resins of this type have all the advantages possessed by those previously described, and have in addition the advantage that they may be obtained in a high-degree of purity, without being mixed with residual amounts of uncombined dye, which are free to come off on and stain the clothing and skin of the user. This is because the colored resins of type E can be washed to eliminate the uncombined dye.

The colored resins of type E have the further advantage that the dyes are attached to the polymers by a solid chemical bond which has no adverse effect on the cosmetic qualities of the polymer.

As was pointed out in the prefatory portion of the specification, colored resins of type E are characterized by the fact that the macromolecular chain thereof comprises monomeric units to which an extra-nuclear amine dye is attached by a chemical bond of the amide type, said bond being formed by the nitrogen of the extra-nuclear amine function.

The said monomeric units may be of any of the following types:

acid anhydrides having the formula:

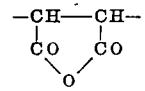

acid halides and particularly acid chlorides having the formula:

esters having the formula:

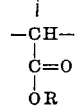

in which R represents an alkyl group comprising from one to four carbon atoms.

In the above cited examples of monomeric units it goes without saying that the carbon atoms making up part of the macromolecular chain may be substituted if so desired.

Among the polymers which may be used as cosmetics and which monomeric units on the basis of which colored polymers according to the invention may be formed are:

polymers having the following formula:

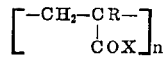

in which:
R represents hydrogen or a methyl radical,
X represents a halogen such as chlorine, and
$n$ is an integer such that the molecular weight is between about 1,000 and about 10,000.

Among the polymers responding to the above formula one of the most useful is polyacrylyl chloride which may easily be obtained by polymerization of an acrylyl chloride in the presence of $\alpha\text{-}\alpha'$-azo-bis-isobutyronitrile, which acts as a catalyst. Other suitable polymers are:

The polymers used to prepare the colored resins of the first type described in this specification, i.e., the polymers obtained by copolymerization of equimolecular quantities of maleic anhydride and an unsaturated monomer such as those having the following formula:

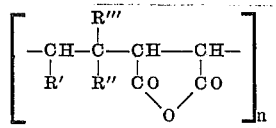

in which:

R' and R'' represent a hydrogen atom, a lower alkyl radical, a phenyl radical or a lower alkoxy radical, with R' and R'' being the same or different, R''' represents either a hydrogen atom, the $-OCOCH_3$ radical, the $-C-N$ radical, or the $-COOCH_3$ radical, and $n$ is an integer.

The polymers obtained by copolymerization of maleic anhydride and an unsaturated monomer which have undergone esterification, in particular those responding to the following formula:

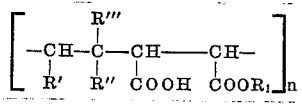

in which:

R', R'', R''' and $n$ have the above-indicated meanings, $R_1$ represents a lower alkyl radical such as $-CH_3, -C_2H_5$ or $-C_4H_{q'}$.

The colored polymers of this type E may be obtained by reacting the extra-nuclear amine dyes on only some of the reacting monomeric units of the polymer, particularly in the case in which the polymers consist entirely of monomeric units which can form bonds of the amide type with extra-nuclear amine dyes.

However, it is also possible to make colored polymers from polymers which have only a certain percentage of monomeric units which are capable of forming an amide bond with the extra-nuclear amine dye, in which case it is clearly possible to make the dyes react on all the monomeric units which have this capability.

In other words, the colored polymers according to the invention may be made wholly of monomeric units to which extra-nuclear amino dyes may be attached by an amide bond, in which case the proportions of dye and polymer which are reacted are chosen in view of the intensity of coloration desired; but they may also consist of macromolecular chains having only a certain percentage of monomeric units which can form an amide bond with the dye.

Among the extra-nuclear amino dyes which may be used are those responding to the following formula:

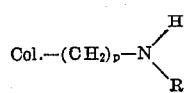

in which:

$p$ is a number between two and six,

R represents either a hydrogen atom, the $-CH_3$ radical, or the $-C_2H_5$ radical.

The expression Col. represents a cyclic or polycyclic dye such for example, as a benzene or anthraquinone dye.

Among the dyes defined above, those having one or two supplementary amine functions attached directly to their ring may be particularly used conforming to the invention.

Conforming to the invention it is possible to attach to a single polymer several extra-nuclear amino dyes so as to obtain the desired shade.

The preparation of the colored polymers according to the invention may be easily carried out by condensing the dye or dyes on the original polymers in the presence of an appropriate solvent which is inert with respect to the dyes.

The polymers according to the invention may also be prepared by condensing the dye on monomers having reacting groups which can form an amide bond with the extra-nuclear amino dyes and then proceeding to a polymerization or a copolymerization.

If it is desired to prepare colored copolymers according to the invention from a polymer resulting from the copolymerization of maleic anhydride and an unsaturated monomer, in which the colored resin comprises monomeric units which have been colored by bonding thereto extra-nuclear amino dyes in accordance with the invention, as well as other monomeric units which have been esterified to produce desired cosmetic properties in the resin, it is possible to proceed along two distinct lines.

First, if desired, a mixture of alcohol and extra-nuclear amino dye may be made to react conjointly on the maleic anhydride/unsaturated monomer copolymer in proportions chosen in view of the desired result.

It is also possible to proceed differently, and to first produce a total semiesterification of the maleic anhydride/unsaturated monomer copolymer, and then cause the extra-nuclear amino dyes according to the invention to react on certain monomeric units of this semiester polymer.

Another object of the present invention is to present the cosmetic products characterized by the fact that they contain the colored polymers defined above.

Another object of the present invention is to present the aerosol lacquers characterized by the fact that they consist of an alcoholic solution containing for example from 2 to 2% colored polymers, this solution being placed in an aerosol bomb with the addition of a liquified propulsive agent under pressure, consisting for example of one or more halogenated hydrocarbons known under the trademark "FREON."

Another object of the present invention is to present the setting lotion characterized by the fact that it consists of an alcoholic solution having an alcohol concentration of, for example, between 20 and 50% and containing for example from 0.5 to 6% by weight colored copolymers such as those defined above.

Conforming to the invention, the aerosol lacquers or setting lotions may also contain other colorless polymers used in cosmetics.

The lacquers and setting lotions according to the invention may also contain all substances generally used in cosmetics, such as for example plasticizers or perfumes.

The cosmetic products obtained according to the invention using colored resins which have been described above have the advantage of not freeing any dye, which on one hand permits these products to be stored without difficulty, and, on the other hand, removes the danger during use of spotting the scalp, skin, linen or clothes of the user.

Several examples disclosing specific colored resins of this second type will now be described together with suitable methods for preparing them. These examples are, of course, given purely by way of illustration, and many others falling within the scope of the foregoing description can be prepared in like manner.

EXAMPLE 13

Preparation of a mixed semiester semiamide colored copolymer by condensing on a methylvinyl/ether/butyl monomaleate copolymer, known under the trademark "Gantrez AN 3953," a dye having the formula:

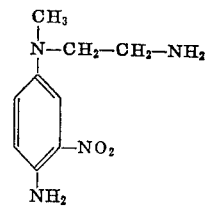

87 g. (0.2 mole) of an alcoholic solution containing 53.5% of the resin sold under the trademark "Gantrez AN 3953" is placed in a flask furnished with agitating means, a thermometer and a reflux condenser and diluted with 60 g. of ethanol. 2.1 g. (0.01 mole) of dye is added and it is heated to reflux for 10 hours. After this time, an alcoholic solution is obtained containing 31% of a red resin.

It is seen from analysis that the quantity of the dye bonded to the polymer by amidification is 95% of that theoretically possible.

By dilution, this solution may be used directly to prepare lacquers or hairsetting lotions.

EXAMPLE 14

Preparation of a mixed semiester semiamide colored copolymer by condensing on a methylvinyl/ether/butyl monomaleate copolymer, known under the trademark "Gantrez AN 3953," a dye having the formula:

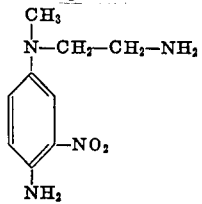

The procedure is the same as that described in example 44, except that four times more dye is reacted, that is 0.04 moles of dye is used instead of 0.01 moles for each 0.2 moles of colorless copolymer.

Analysis shows that the quantity of dye bonded to the polymer by amidification is 90% of that theoretically possible.

This solution may also be used directly to prepare lacquers and setting lotions.

EXAMPLE 15

Preparation of a mixed semiester semiamide colored copolymer by condensing on a methylvinyl/ether/butyl monomaleate copolymer known under the trademark "Gantrez AN 3953," a dye having the formula:

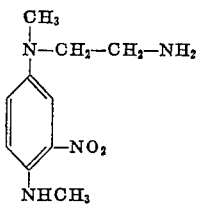

87 g. (0.2 mole) of an alcoholic solution containing 53.5% of the resin sold under the trademark "Gantrez AN 3953" is placed in a flask equipped with agitating means, a thermometer and a reflux condenser, and diluted with 90 g. of ethanol.

4.5 g. (0.02 mole) of the dye having the above formula is added and it is heated to reflux for 9 hours.

After this time, an alcoholic solution containing 27% of a violine-colored resin is obtained.

Analysis shows that the quantity of dye bonded to the polymer by amidification is 86% of that theoretically possible.

EXAMPLE 16

Preparation of a mixed semiester semiamide colored copolymer by condensing on a methylvinyl/ether/butyl monomaleate copolymer known under the trademark "Gantrez AN 3953," a dye having the formula:

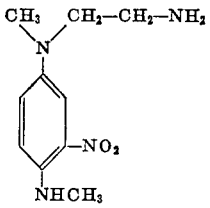

The procedure is the same as that described in example 46, with the exception that twice as much dye is reacted (that is, 0.04 mole of dye for each 0.2 mole of colorless resin).

Analysis shows that the quantity of dye bonded to the polymer by amidification is 88% of that theoretically possible.

EXAMPLE 17

Preparation of a mixed semiester semiamide colored copolymer by condensing on a methylvinyl/ether/butyl monomaleate copolymer known under the trademark "Gantrez AN 3953," a dye having the formula:

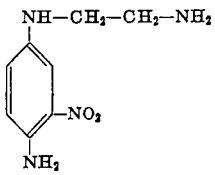

91.5 g. (0.2 mole) of an alcoholic solution containing 50% of the resin sold under the trademark "Gantrez AN 3953" is placed in a flask equipped with agitating means, a thermometer and a reflux condenser, and diluted with 71 g. of ethanol. 3.9 g. (0.02 mole) of dye are added and the mixture heated to reflux for 8 hours.

An alcoholic solution containing 30% raspberry red resin is then obtained.

Analysis shows that the quantity of dye combined with the polymer by amidification is 89% of that theoretically possible.

EXAMPLE 18

Preparation of a mixed semiester semiamide colored copolymer by condensing on a methylvinyl/ether/butyl monomaleate copolymer known under the trademark "Gantrez AN 3953," a dye having the formula:

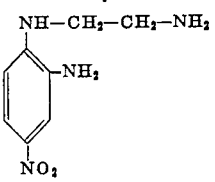

91.5 g. (0.2 mole) of an alcoholic solution containing 50% percent the resin known under the trademark "Gantrez AN 3953" is placed in a flask equipped with agitating means, a reflux condenser and a thermometer and diluted with 150 g. of ethanol. 3.9 g. (0.02 mole) of dye having the above formula is added and the mixture is heated to reflux for 8½ hours.

An alcoholic solution containing 20% of a yellow-orange resin is obtained.

Analysis shows that the quantity of dye combined with the polymer by amidification is 87% of that theoretically possible.

EXAMPLE 19

Preparation of a mixed semiester semiamide colored copolymer by condensing on a methylvinyl/ether/butyl monomaleate copolymer known under the trademark "Gantrez AN 3953" a dye having the formula:

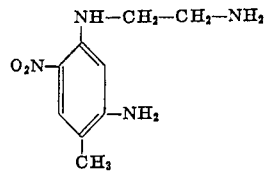

91.5 g. (0.2 mole) of an alcoholic solution containing 50% of the resin known under the trademark "Gantrez AN 3953" is placed in a flask equipped with agitating means, a reflux condenser and a thermometer, and diluted with 155 g. of ethanol.

4.2 g. (0.02 mole) of the dye having the above formula is added and the mixture heated to reflux for 7½ hours. An alcoholic solution containing 20% of a lemon-yellow resin is obtained.

Analysis shows that the quantity of dye combined with the polymer by amidification is 84% of that theoretically possible.

This solution may be used directly to prepare lacquers or setting lotions.

If desired, the colored polymer may always be isolated in the form of a powder by precipitation from its solution and drying.

EXAMPLE 20

Preparation of a mixed semiester semiamide colored copolymer by condensing on a methylvinyl/ether/butyl monomaleate copolymer known under the trademark "Gantrez AN 3953," a dye having the formula:

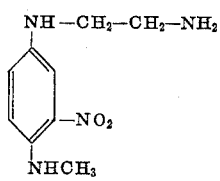

91.5 g.(0.2 mole) of a solution containing 50% of the resin known under the trademark "Gantrez AN 3953" is placed in a flask equipped with agitating means, a reflux condenser and a thermometer and diluted with 155 g. of alcohol. 4.2 g. (0.02 mole) of the above dye is added and it is heated to reflux for 8 hours. An alcoholic solution containing 20% of a violet-colored resin is obtained.

Analysis shows that the quantity of dye combined with the copolymer by amidification is 88% of that theoretically possible.

This solution may be used directly to prepare hair lacquers or setting lotions.

EXAMPLE 21

Preparation of a mixed semiester semiamide colored copolymer by condensing on a methylvinyl/ether/ethyl monomaleate copolymer known under the trademark "Gantrez AN 3152," a dye having the formula:

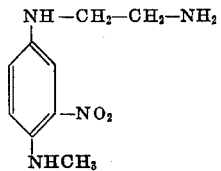

74.8 g. (0.2 mole) of an alcoholic solution containing 54% of the resin known under the trademark "Gantrez AN 3152" is placed in a flask equipped with agitating means, a reflux condenser and a thermometer, and diluted with 144 g. of ethanol.

4.2 g. (0.02 mole) of the dye having the above formula is added and it is heated to reflux for 16 hours. An alcoholic solution containing 20% of a violet-colored resin is obtained.

Analysis shows that the quantity of dye combined with the polymer by amidification is 85% of that theoretically possible.

This solution may be used directly to prepare lacquers or setting lotions.

EXAMPLE 22

Preparation of a mixed semiester semiamide colored copolymer by condensing on a methylvinyl/ether/butyl monomaleate copolymer known under the trademark "Gantrez AN 3953" dye having the formula:

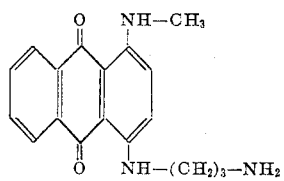

45.75 g. (0.1 mole) of an alcoholic solution containing 50% of the resin known under the trademark "Gantrez AN 3953" is placed in a flask equipped with agitating means, a reflux condenser and a thermometer and diluted with 82 g. of ethanol.

3.09 g. (0.01 mole) of the dye having the above formula is added and the mixture heated to reflux for 13 hours. An alcoholic solution containing 20% of a blue resin is obtained.

Analysis shows that the quantity of dye combined with the polymer by amidification is 88% of that theoretically possible.

This solution may be used directly to prepare lacquers or setting lotions.

EXAMPLE 23

Preparation of a mixed semiester semiamide colored copolymer by condensing on a methylvinyl/ether/butyl monomaleate copolymer known under the trademark "Gantrez AN 3953," a dye having the formula:

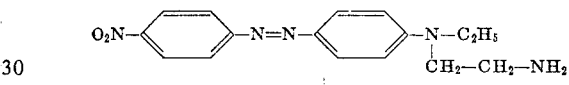

45.8 g. (0.1 mole) of an alcoholic solution containing 50% of the resin known under the trademark "Gantrez AN 3953" is placed in a flask equipped with agitating means, a reflux condenser and a thermometer, and diluted with 38 g. of ethanol.

3.1 g. (0.01 mole) of dye having the above formula is added and the mixture is heated to reflux for 12 hours. An alcoholic solution containing 30% of an orange-red resin is obtained.

Analysis shows that the quantity of dye combined with the polymer by amidification is 80% of that theoretically possible.

This solution may be used directly to prepare hair lacquers or setting lotions.

EXAMPLE 24

Preparation of a mixed semiester semiamide colored copolymer by condensing on a methylvinyl ether/maleic anhydride copolymer n-butyl alcohol and a dye having the formula:

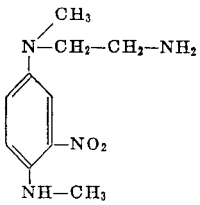

350 ml. of dioxane, 30 g. (0.2 mole) of methylvinyl ether/maleic anhydride copolymer, 13.3 g. (0.18 mole) of n-butanol and 4.48 g. (0.02 mole) of a dye having the above formula are placed in a flask equipped with agitating means, a thermometer and a condenser.

It is heated to reflux for 9 hours. The esterification is completed by the addition of 15 g. (0.2 mole) of n-butanol and it is again heated to reflux for 8 hours.

After reaction, the colored copolymer is precipitated with petroleum ether. After drying, a yield of 89% by weight of a violet powder is obtained. This powder is soluble in alcohol and in a neutralized water-alcohol mixture.

Analysis shows that the quantity of dye bonded to the copolymer by amidification is 84.5% of that theoretically possible.

EXAMPLE 25

Preparation of a mixed semiester semiamide colored copolymer by condensing on a methyl methacrylate/maleic anhydride copolymer n-butyl alcohol and a dye having the formula:

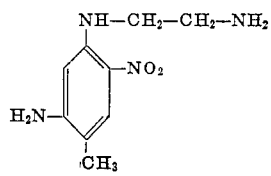

150 cc. of dioxane, 34 g. (0.1 mole) of methyl methacrylate/maleic anhydride copolymer having an anhydride index of 331 (which corresponds to a copolymer containing 29% maleic anhydride and 71% methyl methacrylate), 6.66 g. (0.09 mole) of n-butanol and 2.1 g. (0.01 mole) of the above dye are placed in a flask equipped with agitating means, a thermometer and a condenser.

The mixture is heated to reflux for 16 hours; then the esterification is completed by adding 7.4 (0.1 mole) of n-butanol and it is again heated to reflux for 8 hours.

After condensation, the colored copolymer is precipitated with petroleum ether. After drying, a yellow powder is obtained. The yield is 85% by weight, and this powder is soluble in alcohol and in a water-alcohol mixture in its neutralized form.

Analysis shows that the quantity of dye combined with the polymer by amidification is 83% of that theoretically possible.

The colored resins obtained according to the above cited examples may be separated from the solution, which also contains dye which has not participated in the amidification reaction, by adding to the reaction solution enough ether, for example, to cause the precipitation of the colored resin which may then be washed and dried.

In practice it may not be necessary to proceed to such a purification by precipitation of the colored resin and the reaction mixture may for example, be used as is to prepare lacquers or setting lotions, particularly in the case in which most of the dye has been fixed by amidification and the dye remaining in solution does not pose any difficulty for the contemplated application.

In the above-cited examples, the initial resin used is a commercial resin which is sold in the esterified state, so that it is not necessary to esterify it. It goes without saying that the same results may be obtained by starting with an unesterified resin which is esterified in a conventional manner with an alcohol.

EXAMPLE 26

Preparation of a mixed semiester semiamide colored copolymer by condensing on a methylvinyl/ether/butyl monomaleate copolymer a dye having the formula:

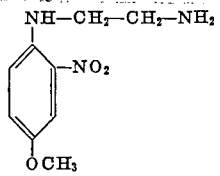

45.75 g. (0.1 mole) of an alcoholic solution containing 50.2% of the methylvinyl/ether/butyl monomaleate copolymer known under the trademark "Gantrez AN 3953" is placed in a flask equipped with agitating means, a reflux condenser and a thermometer and diluted with 36 g. of ethanol.

2.22 g. (0.01 mole) of the above dye are added and the mixture is heated to reflux for 15 hours. An alcoholic solution containing 30% of a yellow-orange resin is obtained.

It is found by analysis that the quantity of the dye bonded to the copolymer by amidification is 96.5% of that theoretically possible.

EXAMPLE 27

Preparation of a mixed semiester semiamide colored copolymer by condensing on a methylvinyl/ether/butyl monomaleate copolymer a dye having the formula:

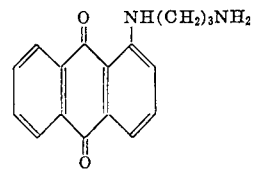

91.5 g. (0.2 mole) of an alcoholic solution containing 50.2% of the methylvinyl/ether/butyl monomaleate copolymer known under the trademark "Gantrez AN 3953" are placed in a flask equipped with agitating means, a thermometer and a reflux condenser and diluted with 75 g. of ethanol. 5.6 g. (0.02 mole) of the above dye are added and the mixture is heated to reflux for 23 hours.

An alcoholic solution containing 30% of a red resin is obtained.

It is found by analysis that the quantity of the dye bonded to the copolymer by amidification is 95.5% of that theoretically possible.

EXAMPLE 28

Preparation of a mixed semiester semiamide colored copolymer by condensing on a methylvinyl/ether/butyl monomaleate copolymer a dye having the formula:

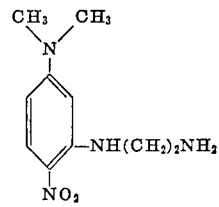

91.5 g. (0.2 mole) of an alcoholic solution containing 50.2% of methylvinyl/ether/butyl monomaleate copolymer known under the trademark "Gantrez AN 3953" are placed in a flask equipped with agitating means, a thermometer and a reflux condenser.

4.48 g. (0.02 mole) of the dye indicated above are added and the mixture heated to reflux for 15 hours.

An alcoholic solution containing 30% of a yellow resin is obtained.

It is found by analysis that the quantity of the dye bonded to the copolymer by amidification is 96% of that theoretically possible.

EXAMPLE 29

Preparation of a mixed semiester semiamide colored copolymer by condensing on a methylvinyl/ether/butyl monomaleate copolymer a dye having the formula:

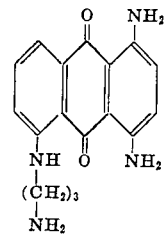

89 g. (0.2 mole) of an alcoholic solution containing 51.7% of the methylvinyl/ether/butyl monomaleate copolymer known under the trademark "Gantrez AN 3953" are placed in a flask equipped with agitating means, a reflux condenser and a thermometer and diluted with 79 g. of ethanol.

6.2 g. (0.02 mole) of the above dye are added and the mixture is heated to reflux for 20 hours.

An alcoholic solution containing 30% of a blue resin is obtained.

It is found by analysis that the quantity of the dye fixed on the copolymer by amidification 80% of that theoretically possible.

EXAMPLE 30

Preparation of a mixed semiester semiamide colored copolymer by condensing on a methylvinyl/ether/maleic anhydride copolymer n-butyl alcohol and a dye having the formula:

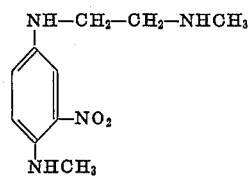

200 ml. of anhydrous dioxane, 30 g. (0.2 mole) of the methylvinyl ether/maleic anhydride copolymer known under the trademark "Gantrez AN 119," 13.3 g. (0.18 mole) of n-butanol and 4.48 g. (0.02 mole) of the above dye are placed in a flask equipped with agitating means, a thermometer and a reflux condenser. The mixture is heated to reflux for 12 hours. The esterification is completed by the addition of 14.8 g. (0.2 mole) of n-butanol and the mixture is again heated to reflux for 8 hours.

After reaction, the colored copolymer is precipitated with petroleum ether. After drying, a violet-red powder is obtained. The yield is 87% by weight.

It is found by analysis that the quantity of the dye fixed on the copolymer by amidification is 83% of that theoretically possible.

EXAMPLE 31

Preparation of a mixed semiester semiamide colored copolymer by condensing on an ethylene/maleic anhydride copolymer n-butyl alcohol and a dye having the formula:

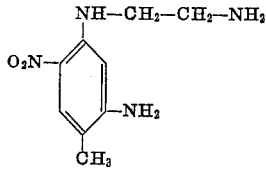

150 ml. of anhydrous dioxane, 28.6 g. (0.2 mole) of the ethylene/maleic anhydride copolymer known under the trademark "DX 840-11," 13.3 g. (0.18 mole) of n-butanol and 4.2 g. (0.02 mole) of the above dye are placed in a flask equipped with agitating means, a reflux condenser and a thermometer.

It is heated to reflux for 15 hours. The esterification is completed by the addition of 14.8 g. (0.2 mole) of n-butanol and the mixture is again heated to reflux for 8 hours.

After reaction, the colored copolymer is precipitated with ethyl ether. After drying, a yellow powder is obtained. The yield is 80% by weight. 90% of the dye is bonded to the copolymer.

EXAMPLE 32

Preparation of a colored polymer by condensing on 1 mole of polyacrylyl chloride 0.75 mole of water and 0.25 mole of a dye having the formula:

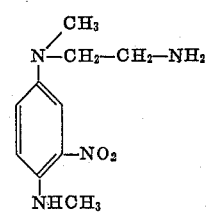

11.2 g. (0.05 mole) of the above dye dissolved in 140 ml. of pure dioxane, 20 g. (0.2 mole) of triethylamine and 2.7 g. (0.15 mole) of water are placed in a 500 ml. flask equipped with agitating means, a thermometer, an air condenser and a tube for introducing nitrogen. With the temperature held at 25° C., 18 g. (0.2 mole) of polyacrylyl chloride prepared in the usual manner, dissolved in 70 ml. of anhydrous dioxane, are added drop by drop. The mixture is stirred for 5 hours at ordinary temperatures. The resultant triethylamine hydrochloride is filtered and the colored polymer dissolved in the filtrate is precipitated with petroleum ether.

A fluid resin is obtained which, after washing with water and drying, yields 65% by weight of a violet-red powder.

It is found by analysis that the quantity of the dye bonded to the polymer by amidification is 81% of that theoretically possible.

EXAMPLE 33

Preparation of a semiester semiamide colored copolymer by condensing on a 30% butyl acrylate/70% acrylyl chloride copolymer a dye having the formula:

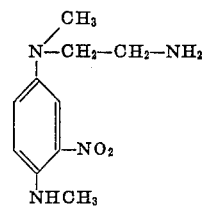

11.2 g. (0.05 mole) of the above dye, dissolved in 160 ml. of pure dioxane, 11.6 g. (0.116 mole) of triethylamine and 1.19 g. (0.066 mole) of water are placed in a 500 cc. flask equipped with agitating means, a thermometer, an air condenser and a tube for introducing nitrogen. While the temperature is held at about 20° C., a solution of 16.9 g. (0.166 mole) of a 30% butyl acrylate/70% acrylyl chloride copolymer obtained in the usual manner, dissolved in 100 ml. of anhydrous dioxane, is added drop by drop.

The mixture is stirred for 2½ hours at ordinary temperatures. The resulting triethylamine chloride is filtered and the colored copolymer dissolved in the filtrate is precipitated with ethyl ether.

A resin is obtained which, after washing with water and drying, yields 70% by weight of a violet-red powder.

It is found by analysis that the quantity of the dye bonded to the copolymer by amidification is 77% of that theoretically possible, and that the colored copolymer thus obtained is a 30% butyl acrylate/40% acrylic acid/30% 1-N-methylamino-2-nitro-4-N,N(methyl-β-acryloylaminoethyl)-amino benzene copolymer.

EXAMPLE 34

Preparation of a colored copolymer by copolymerization of an N-(1-acryloylaminopropyl)-aminoanthraquinone colored monomer with vinylpyrrolidone.

47.5 g. of vinylpyrrolidone, 2.5 g. of 1-N-(acryloylaminopropyl)-aminoanthraquinone [obtained by condensing acrylyl chloride on the dye N-(1-aminoanthraquinone)] and 0.5 g. of azo-bis-isobutyronitrile in solution in 150 ml. of anhydrous dioxane are placed in a flask equipped with agitating means, a thermometer, a reflux condenser and a tube for introducing nitrogen. The mixture is heated to reflux. After 7 hours of heating, the polymerization is terminated. The colored copolymer in solution is precipitated with ethyl ether.

A resin is obtained which, after drying, yields 64% by weight of a red powder.

It is found by analysis that the resulting colored copolymer is a 95% vinylpyrrolidone/5% 1-N-(acryloylaminopropyl)-aminoanthraquinone copolymer.

Resins of the type described in examples 13-34 may be used in both hair lacquers and hair setting lotions.

EXAMPLE 35

To prepare a setting lotion according to the invention, the following solution is prepared:

| | |
|---|---|
| Copolymer obtained as in example 15 | 2 g. |
| Triisopropanolamine, g.s.p. | pH=7 |
| Ethyl alcohol | 50 ml. |
| Water, q.s.p. | 100 ml. |

This lotion is applied to natural brown hair after shampooing, that is to dampened and dried hair. The hair is then set in the customary manner.

When dry, the hair is shiny and easily arranged. A violine mahogany shade results.

EXAMPLE 36

To prepare a setting lotion according to the invention, the following solution is prepared:

| | |
|---|---|
| Copolymer obtained as in example 14 | 2 g. |
| Triisopropanolamine, q.s.p. | pH=7 |
| Ethyl alcohol | 50 ml. |
| Water, q.s.p. | 100 ml. |

This lotion is then applied to natural warm-chestnut hair, dampened and dried and the hair is set in the usual way.

After drying the hair is shiny and strong, a lustrous mahogany shade is obtained.

EXAMPLE 37

To prepare a setting lotion according to the invention, the following solution is prepared:

| | |
|---|---|
| Copolymer obtained as in example 13 | 2 g. |
| Triisopropanolamine, q.s.p. | pH=7 |
| Ethyl alcohol | 50 ml. |
| Water, q.s.p. | 100 ml. |

This lotion is applied to natural chestnut hair, which has previously been shampooed, that is to dampened and dried hair.

The hair is then set in the usual way.

After drying, the hair is shiny and strong. A rosewood shade is obtained.

EXAMPLE 38

To prepare a colored aerosol lacquer according to the invention, the following solution is first prepared:

| | |
|---|---|
| Copolymer obtained as in example 17 | 1.5 g. |
| Copolymer obtained as in example 15 | 0.5 g. |
| Methylvinyl/ether/ethyl monomaleate copolymer known under the trademark of "Gantrez AN 3152" | 5 g. |
| Triisopropanolamine, q.s.p. | pH=6 |
| Absolute alcohol, q.s.p. | 100 g. |

30 g. of this solution are then placed in an aerosol bomb with 43.8 g. of the product known under the trademark "FREON 11" and 26.1 g. of the product known under the trademark "FREON 12."

When this is sprayed on the hair, the result is a very bright auburn lacquer which brings out the yellow glints of the hair. It does not rub off on linen or pillowcases. It comes out easily with brushing or shampooing.

EXAMPLE 39

To prepare a colored aerosol lacquer according to the invention, the following solution is first prepared:

| | |
|---|---|
| Copolymer obtained as in example 17 | 1.5 g. |
| Copolymer obtained as in example 16 | 0.5 g. |
| Methylvinyl/ether/ethyl monomaleate copolymer, known under the trademark "Gantrez AN 3152" | 5 g. |
| Triisopropanolamine, q.s.p. | pH=6 |
| Absolute alcohol, q.s.p. | 100 g. |

30 g. of this solution are then placed in an aerosol bomb with 43.8 g. of the product known under the trademark "FREON 11" and 26.1 g. of the product known under the trademark "FREON 12."

When this is sprayed on the hair, a lacquer of a very shiny mahogany shade is obtained, which brings out the yellow glints of the hair. It comes out under brushing and does not rub off on pillowcases or linen.

EXAMPLE 40

To prepare a colored aerosol lacquer according to the invention, the following solution is first prepared:

| | |
|---|---|
| Copolymer obtained as in example 23 | 0.15 g. |
| Copolymer obtained as in example 21 | 1 g. |
| Copolymer obtained as in example 20 | 0.92 g. |
| Methylvinyl/ether/ethyl monomaleate copolymer known under the trademark "Gantrez AN 3152" | 5 g. |
| Triisopropanolamine, q.s.p. | pH=6.2 |
| Absolute alcohol, q.s.p. | 100 g. |

30 g. of this solution are then placed in an aerosol bomb with 43.8 g. of the product known under the trademark "FREON 11" and 26.1 g. of the product known under the trademark "FREON 12."

A chestnut lacquer which will not rub off on linen or pillowcases is

EXAMPLE 41

To prepare a colored aerosol lacquer according to the invention, the following solution is first prepared:

| | |
|---|---|
| Copolymer as in example 23 | 3 g. |
| Copolymer obtained as in example 22 | 0.5 g. |
| Methylvinyl/ether/ethyl monomaleate copolymer known under the trademark "Gantrez AN 3152" | 5 g. |
| Triisopropanolamine, q.s.p. | pH=6.3 |
| Absolute alcohol, q.s.p. | 100 g. |

30 g. of this solution are then placed in an aerosol bomb with 43.8 g. of the product known under the trademark "FREON 11" and 26.1 g. of the product known under the trademark "FREON 12."

A blue lacquer with light violet overtones is obtained and may be applied to dark hair.

This lacquer comes out easily with brushing or shampooing.

EXAMPLE 42

To prepare a colored aerosol lacquer according to the invention, the following solution is first prepared:

| | |
|---|---|
| Copolymer obtained as in example 23 | 0.25 g. |
| Copolymer obtained as in example 22 | 0.66 g. |
| Copolymer obtained as in example 18 | 0.19 g. |
| Methylvinyl/ether/ethyl monomaleate copolymer known under the trademark "Gantrez AN 3152" | 5 g. |
| Triisopropanolamine, q.s.p. | pH=6.2 |
| Absolute alcohol, q.s.p. | 100 g. |

30 g. of this solution are then placed in an aerosol bomb with 43.8 g. of the product known under the trademark "FREON 11" and 26.1 g. of the product known under the trademark "FREON 12."

When this is sprayed on blond hair, a lacquer with pearly tones is obtained. This lacquer does not rub off on linen or pillowcases and comes out equally well with brushing or shampooing.

EXAMPLE 43

To prepare a colored aerosol lacquer according to the invention, the following solution is first prepared:

| | |
|---|---|
| Copolymer obtained as in example 23 | 0.10 g. |
| Copolymer obtained as in example 21 | 0.15 g. |
| Copolymer obtained as in example 20 | 0.11 g. |
| Methylvinyl/ether/ethyl monomaleate copolymer known under the trademark "Gantrez AN 3152" | 5 g. |
| Triisopropanolamine q.s.p. | pH=6.2 |
| Absolute alcohol q.s.p. | 100 g. |

30 g. of this solution are placed in an aerosol bomb with 43.8 g. of the product known under the trademark "FREON 11" and 26.1 g. of the product known under the trademark "FREON 12."

When this is sprayed on the hair, a lustrous grey lacquer is obtained which is particularly recommended for highly discolored hair.

EXAMPLE 44

To prepare a colored aerosol lacquer according to the invention, the following solution is first prepared:

| | |
|---|---|
| Copolymer obtained as in example 26 | 0.1 g. |
| Copolymer obtained as in example 27 | 0.05 g. |
| Methylvinyl/ether/butyl monomaleate copolymer known under the trademark "Gantrez AN 3953" | 5 g. |
| Triisopropanolamine q.s.p. | 6.2 |
| Absolute alcohol q.s.p. | 100 g. |

35 g. of this solution are placed in an aerosol bomb with 27 g. of the fluorinated hydrocarbon known under the trademark "FREON 11" and 38 g. of the fluorinated hydrocarbon known under the trademark "FREON 12."

When this is sprayed on chestnut or blond hair, a lacquer yielding golden glints is obtained.

It does not rub off on linen and comes out easily with brushing or shampooing.

EXAMPLE 45

To prepare a colored aerosol lacquer according to the invention, the following solution is first prepared:

| | |
|---|---|
| Copolymer obtained as in example 22 | 0.1 g. |
| Copolymer obtained as in example 23 | 0.2 g. |
| Methylvinyl/ether/butyl monomaleate copolymer known under the trademark "Gantrez AN 3953" | 5 g. |
| Triisopropanolamine q.s.p. | pH 6.3 |
| Absolute alcohol q.s.p. | 100 g. |

35 g. of this solution are placed in an aerosol bomb with 27 g. of the fluorinated hydrocarbon known under the trademark "FREON 11" and 38 g. of the fluorinated hydrocarbon known under the trademark "FREON 12."

When this is sprayed on hair, a lacquer of silver-grey shade is obtained which is particularly recommended for white hair.

EXAMPLE 46

To prepare a colored aerosol lacquer according to the invention the following solution is first prepared:

| | |
|---|---|
| Copolymer obtained as in example 15 | 0.07 g. |
| Copolymer obtained as in example 13 | 0.73 g. |
| Copolymer obtained as in example 21 | 0.36 g. |
| Methylvinyl/ether/butyl monomaleate copolymer known under the trademark "Gantrez AN 3953" | 5 g. |
| Triisopropanolamine q.s.p. | pH 6.2 |
| Absolute alcohol q.s.p. | 100 g. |

35 g. of this solution are placed in an aerosol bomb with 27 g. of the fluorinated hydrocarbon known under the trademark "FREON 11" and 38 g. of the fluorinated hydrocarbon known under the trademark "FREON 12."

A natural chestnut lacquer is obtained which does not rub off on linen or pillowcases.

EXAMPLE 47

To prepare a setting lotion according to the invention, the following solution is prepared:

| | |
|---|---|
| Copolymer obtained as in example 26 | 0.5 g. |
| Polyvinylpyrrolidone | 1.5 g. |
| 2-amino-2-methyl-1-propanol q.s.p. | pH 8 |
| Ethyl alcohol q.s.p. | 50° |
| Water q.s.p. | 100 g. |

This lotion is applied to brown hair after shampooing and the hair is then set.

A violine mahogany shade is obtained.

EXAMPLE 48

To prepare a colored aerosol lacquer according to the invention, the following solution is first prepared:

| | |
|---|---|
| Copolymer obtained as in example 17 | 1.5 g. |
| Copolymer obtained as in example 25 | 0.5 g. |
| Methylvinyl/ether/butyl monomaleate copolymer known under the trademark "Gantrez AN 3953" | 5 g. |
| Triisopropanolamine q.s.p. | pH 6 |
| Absolute alcohol q.s.p. | 100 g. |

35 g. of this solution are placed in an aerosol bomb with 27 g. of the fluorinated hydrocarbon known under the trademark "FREON 12."

When this is sprayed on the hair, a shiny lacquer with an auburn shade is obtained which does not rub off on linen.

It will be noted that when acid anhydrides are used to form part of the polymers of type E, the anhydride group is only partially substituted leaving free acid groups having water solubilizing properties. When acid halides or esters are used a certain number of acid halide or ester groups remain unreacted and hence act as water solubilizing groups.

Hair setting lotions and lacquers employing those colored polymers designated in the prefatory portion of this specification as utilizing colored polymers of type F will now be described, together with methods of using such lotions and lacquers.

The novel colored polymers of type F according to the present invention are characterized by the fact that they may be manufactured with a degree of consistency in their physical characteristics and colors, and that they have a particularly strong coloring effect since it is possible to attach a notably higher number of molecules of dye to the structural chain of the polymer than is the case with those colored polymers known up to the present time.

Due to this fact, colored polymers of type F contemplated by the present invention may be used very advantageously when mixed with colorless polymers chosen for their good cosmetic quality so as to impart to these colorless polymers a particular coloration. Because of the intensity of the coloring effect obtained with polymers of this type, the addition of small quantities thereof to colorless polymers is sufficient to produce the desired coloring effect without impairing the cosmetic qualities of the latter polymers.

As hereinbefore pointed out, colored resins of type F consist of a colored polymer comprising a homopolymer to the macromolecular chain of which at least one amine dye is attached by a chemical bond of the amide type.

The term "colored homopolymer" is used in the present description to designate resins consisting of homopolymers to which dyes have been attached at certain places while other groups, for example "alcohol" groups, may be attached at other places. In other words, the expression "colored homopolymer" thus signifies that the colored resin has been obtained from a homopolymer but not necessarily that the colored polymer taken as a chemical entity is itself a homopolymer, that is, that all its monomeric units are identical.

According to a preferred embodiment of this type of colored polymer according to the invention, the amine dye used to dye the homopolymer consists of an extra-nuclear amine dye in which the nitrogen of the extra-nuclear amine function is used to form the amide bond which binds the dye to the homopolymer.

In particular, it is possible to use extra-nuclear amine dyes having the following formula:

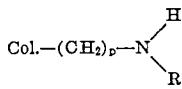

in which:

p is an integer between two and six inclusive,

R represents a hydrogen atom, the -CH₃ radical, or the -C₂H radical, the expression "Col." represents a cyclic or polycyclic dye such as for example, benzene or anthraquinone dyes.

Among the dyes having the formula are those which have, in addition to the amine function which is used for the bond with the polymer, at least one other amine function, substituted directly on the ring.

Among the homopolymers which may be combined with the above dyes are those organic acid anhydrides having an ethylenic bond, such as maleic anhydride homopolymer, itaconic anhydride polymer, acrylic anhydride homopolymer, methacrylic anhydride homopolymer, and a mixed acrylic/methacrylic anhydride, although this list is by no means exhaustive.

In accordance with the invention, it is possible to form colored homopolymers in which some of the amine functions are broken up by using dyes as described above, while the other amine functions are broken up by using alcohols such as butanol or ethanol.

For example, dye molecules in a quantity amounting to 5 to 25% of the number of anhydride functions may be condensed on the homopolymer, while the rest of the anhydride functions are broken up by one or more alcohols.

Colored homopolymers as defined above may be mixed with colorless polymers such as a polyvinylpyrrolidone, polyvinylpyrrolidone/vinyl acetate copolymers or other colorless polymers of known types thereby producing a colored mixture particularly suitable for cosmetic use.

In particular, it has been proposed to use such colored resins in manufacturing hairsetting lotions or aerosol lacs which, after the evaporation of the solvent or the diluting agent, leave a coating of resin on the hair. This permits the desired coloration to be obtained while fixing the shape of the coiffure.

Another object of the present invention is to provide the new industrial product which consists of a setting lotion essentially characterized by the fact that it contains at least one colored homopolymer as defined above in a hydroalcoholic solution and in the presence of a mineral or organic base permitting the neutralization of the carboxyl acid functions of the homopolymer.

Setting lotions according to the invention may also contain other colorless resins utilized in cosmetics, or other colored resins, as well as the adjuvants generally used in cosmetics, such as perfumes, surface-active agents or penetrating or swelling agents.

In one preferred embodiment of the invention, the setting lotion contains for example from 0.5 to 0.6% colored homopolymers.

Several examples of colored resins of the type F, and methods of preparing them, will now be described purely by way of illustration.

EXAMPLE 49

Preparation of a colored mixed semiester semiamide polymer by condensing on polymaleic anhydride both n-butyl alcohol and a dye having the formula:

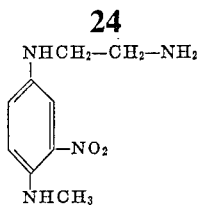

300 ml. of anhydrous dioxane, 29.4 g. (0.3 moles) of polymaleic anhydride, 6.3 g. (0.03 moles) of a dye having the above formula and 20 g. (0.27 moles) of n-butanol are placed in a flask equipped with agitating means, a thermometer and a reflux condenser. This is heated to reflux for 10 hours. Esterification is completed by adding 22.2 g. (0.3 moles) of n-butanol and again heating to reflux for 7 hours.

The colored copolymer is then precipitated with petroleum ether. Drying yields 83% by weight of a violet powder which is soluble in alcohol and in a hydroalcoholic solution.

Analysis shows that the quantity of dye combined with the polymer by amidification is 82% of that theoretically possible.

EXAMPLE 50

Preparation of a colored mixed semiester semiamide polymer by condensing on polyitaconic anhydride both n-butyl alcohol and a dye having the formula:

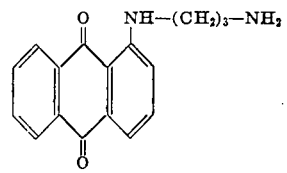

33.6 g. (0.3 moles) of polyitaconic anhydride, 200 g. of anhydrous dioxane, 4.2 g. (0.015 moles) of dye having the above formula and 21 g. (0.285 moles) of n-butanol are placed in a flask equipped with agitating means, a thermometer and a reflux condenser. The mixture is heated to reflux for 15 hours. The esterification is completed by addition of 22.2 g. (0.3 mol-g.) of n-butanol and it is again heated to reflux for 7 hours.

The colored copolymer is then precipitated with petroleum ether. Drying yields 79.5% by weight of a red powder, which is soluble in alcohol and in a hydroalcoholic mixture.

It is found by analysis that 100% of the theoretically possible quantity of dye is bonded to the polymer by amidification.

EXAMPLE 51

Preparation of a colored mixed semiester semiamide polymer by condensing on polyacrylic anhydride both n-butyl alcohol and a dye having the formula:

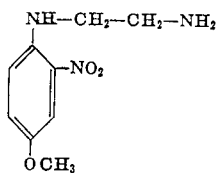

37.8 g. (0.3 mol-g.) of polyacrylic anhydride, 200 g. of anhydrous dioxane, 3.165 g. (0.015 mol-g.) of dye having the above formula and 21 g. (0.285 mol-g.) of n-butanol are placed in a flask equipped with agitating means, a thermometer and a reflux condenser.

The mixture is heated to reflux for 12 hours. Esterification is completed by the addition of 22.2 g. (0.3 mol-g.) of n-butanol and it is again heated to reflux for 8 hours.

The colored copolymer is then precipitated with petroleum ether. After drying, an orange-yellow powder is obtained. The yield is 82% by weight. This powder is soluble in alcohol and in a hydroalcoholic mixture.

It is found by analysis that the quantity of dye bonded to the polymer by amidification is 100% of that theoretically possible.

EXAMPLE 52

Preparation of a colored mixed semiester semiamide polymer by condensing on polymethacrylic anhydride both n-butyl alcohol and a dye having the formula:

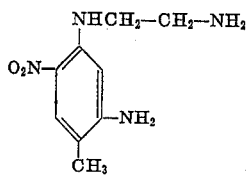

46 g. (0.3 mol-g.) of polymethacrylic anhydride, 200 g. of anhydrous dioxane, 3.15 g. (0.015 mol-g.) of a dye having the above formula and 21 g. (0.285 mol-g.) of n-butanol are placed in a flask equipped with agitating means, a thermometer and a reflux condenser.

The mixture is heated to reflux for 15 hours. Esterification is completed by adding 22.2 g. (0.3 mol-g.) of n-butanol and it is again heated to reflux for 7 hours.

The colored copolymer is then precipitated with petroleum ether. After drying, the yield is 71.5% by weight of a yellow powder which is soluble in alcohol and in a hydroalcoholic mixture.

It is found by analysis that the quantity of dye bonded to the polymer by amidification is 100% of that theoretically possible.

EXAMPLE 53

Preparation of a colored mixed semiester semiamide polymer by condensing on a mixed polyacrylic-methacrylic anhydride both n-butyl alcohol and a dye having the formula:

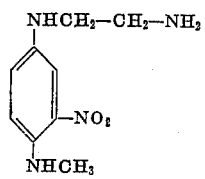

42 g. (0.3 moles) of mixed polyacrylic-methacrylic anhydride, 200 g. of dioxane, 3.15 g. (0.015 moles) of a dye having the above formula and 21 g. (0.285 moles) of n-butanol are placed in a flask equipped with agitating means, a thermometer and a reflux condenser.

The mixture is heated to reflux for 15 hours. Esterification is completed by the addition of 22.2 g. (0.3 moles) of n-butanol and it is again heated to reflux for 7 hours.

The colored copolymer is then precipitated with petroleum ether. Drying yields 76% by weight of a red violet powder which is soluble in alcohol and in a hydroalcoholic solution.

It is found by analysis that the quantity of dye bonded to the polymer by amidification is 68.4% of that theoretically possible.

EXAMPLE 54

To set hair with a lotion conforming to the invention, the following solution is prepared:

| | |
|---|---|
| Polymer obtained as in example 49 | 2 g. |
| 2-amino-2-methyl-1-propanol q.s.p. | pH 8.5 |
| Ethyl alcohol q.s.p. | 50° |
| Water q.s.p. | 100 ml. |

This solution is applied to brown hair which has previously been shampooed and the hair is set in the usual manner.

When the hair is dried and arranged it has a violine mahogany shade.

EXAMPLE 55

To obtain a setting lotion according to the invention, the following solution is prepared:

| | |
|---|---|
| Polymer obtained as in example 51 | 1.3 g. |
| Polymer obtained as in example 50 | 0.7 g. |
| 2-amino-2-methyl-1-propanol q.s.p. | pH 8 |
| Ethyl alcohol q.s.p. | 50° |
| Water q.s.p. | 100 ml. |

This lotion is applied to chestnut or blond hair which has been dampened and dried and the hair is then set in the usual manner.

After drying the hair shines and has golden glints.

EXAMPLE 56

To obtain a setting lotion according to the invention the following solution is prepared:

| | |
|---|---|
| Polymer obtained as in example 53 | 0.8 g. |
| Polymer obtained as in example 51 | 0.2 g. |
| Methylvinyl/ether/butyl monomaleate copolymer known under the trademark "Gantrez AN 3953" | 1.5 g. |
| 2-amino-2-methyl-1-propanol q.s.p. | pH 8 |
| Ethyl alcohol q.s.p. | 50° |
| Water q.s.p. | 100 ml. |

This solution is applied to natural warm chestnut hair and the hair is then set.

After drying the hair is strong and shiny with mahogany glints.

In the above examples Freon 11 is trichloromonofluoromethane, Freon 12 is dichlorodifluoromethane, Gantrez AN-119 has a specific viscosity of 0.1–0.5 in a 1% solution of the copolymer in methylethyl ketone at 25° C., Gantrez AN-3152 is the half ethyl ester of Gantrez AN-119 and Gantrez AN-3953 is the half butyl ester.

What is claimed is:

1. A composition for treating live human hair comprising a solution of a hair coloring amount of a solid colored polymer and a solvent therefor, said solvent being selected from the group consisting of water, alcohol and their mixtures, said polymer consisting essentially of 2–30 weight percent of a first monomer containing a reactive epoxy group and being selected from the group consisting of glycidyl methacrylate, glycidyl acrylate and allylglycidyl ether, 5–30 weight percent of a second comonomer consisting of vinyl pyrrolidone, the remaining comonomer being essentially vinyl acetate, and a dye selected from the group consisting of anthraquinone and benzene dyes containing an extra-nuclear radical having the formula

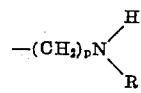

wherein R is selected from the group consisting of hydrogen, $-CH_3$ and $-C_2H_5$ and $p$ is 2–6, said extra-nuclear radical being bonded to the aromatic nucleus of said dye through a nitrogen atom directly attached to said aromatic nucleus and said dye being bonded to said reactive epoxy group through the terminal nitrogen atom of said extra-nuclear radical, the quantity of said dye combined with said polymer by condensation of the epoxy group ranging between 75%–90% of theoretical, said polymer being present in said composition in amounts ranging from about 0.5 to 20% based on the weight of said composition.

2. The composition of claim 1 wherein the solvent is an aqueous alcoholic solution containing 20–50 weight percent alcohol and said colored polymer is present in amounts ranging from about 0.5 to 6% by weight of said composition.

3. A pressurized sprayable aerosol composition for treating live human hair comprising a solution of a hair coloring amount of a solid colored polymer and a solvent therefor, said solvent being selected from the group consisting of alcohol and water-alcohol, said colored polymer consisting essentially of 2–30 weight percent of a first comonomer containing a reactive epoxy group and being selected from the group consisting of glycidyl methacrylate, glycidyl acrylate and allylglycidyl ether, 5–30 weight percent of a second comonomer consisting of vinyl pyrrolidone, the remaining comonomer being essentially vinyl acetate, and a dye selected from the group consisting of anthraquinone and benzene dyes containing an extra-nuclear radical having the formula

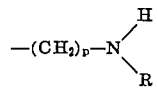

wherein R is selected from the group consisting of hydrogen, $-CH_3$ and $-C_2H_5$ and $p$ is 2-6, said extra-nuclear radical being bonded to the aromatic nucleus of said dye through a nitrogen atom directly attached to said aromatic nucleus and said dye being bonded to said reactive epoxy group through the terminal nitrogen atom of said extra-nuclear radical, the quantity of said dye combined with said polymer by condensation of the epoxy group extra-nuclear between 75%-90% of theoretical, said polymer being present in amounts ranging from about 2-20 weight percent of the solution of colored polymer and solvent and a halogenated hydrocarbon aerosol propellant present in amounts ranging from about 2-3 times the weight of said solution of colored polymer and solvent.

4. A composition for treating live human hair comprising a solution of a hair coloring amount of a solid colored polymer and a solvent therefor, said solvent being selected from the group consisting of water, alcohol and their mixtures, said polymer selected from the group of 1. recurring units corresponding to the formula

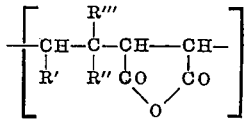

wherein R' and R'' each independently represent a member selected from the group consisting of hydrogen, lower alkyl and lower alkoxy and R''' represents a member selected from the group consisting of hydrogen and $-COOCH_3$;

2. recurring units corresponding to the formula

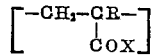

wherein R is selected from the group consisting of hydrogen and methyl and X represents chlorine; and 3. recurring units corresponding to the formula

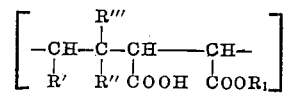

wherein R' and R'' each independently represent a member selected from the group consisting of hydrogen, lower alkyl, and lower alkoxy, R''' represents a member selected from the group consisting of hydrogen and $-COOCH_3$ and $R_1$ represents lower alkyl, and a dye selected from the group consisting of azo, anthraquinone and benzene dyes containing an extra-nuclear radical having the formula

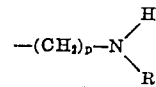

wherein R is selected from the group consisting of hydrogen, $-CH_3$ and $-C_2H_5$ and $p$ is 2-6, said extra-nuclear radical being bonded to the aromatic nucleus of said dye through a nitrogen atom directly attached to said aromatic nucleus and said dye being bonded to said recurring units by an amide bond through the terminal nitrogen atom of said extra-nuclear radical, the quantity of said dye combined with said polymer by amidification ranging between 80-96.5% of theoretical, said polymer being present in said composition in amounts ranging from about 0.5 to 20% based on said composition.

5. The composition of claim 4 wherein the solvent is alcohol and said colored polymer is present in amounts ranging from about 2-20 weight percent of said composition.

6. The composition of claim 4 wherein the solvent is an aqueous alcoholic solution containing about 20-50 weight percent alcohol and said colored polymer is present in amounts ranging from about 0.5 to 6 weight percent of said composition.

* * * * *